Feb. 3, 1925.

H. PERKINS

FLUID LEVEL INDICATOR

Filed July 14, 1920

1,524,950

INVENTOR.
HENRY PERKINS.
BY A.B.Bowman
ATTORNEY

Patented Feb. 3, 1925.

1,524,950

UNITED STATES PATENT OFFICE.

HENRY PERKINS, OF SAN DIEGO, CALIFORNIA.

FLUID-LEVEL INDICATOR.

Application filed July 14, 1920. Serial No. 396,228.

*To all whom it may concern:*

Be it known that I, HENRY PERKINS, a citizen of the United States, residing at San Diego, in the county of San Diego and State of California, have invented certain new and useful Fluid-Level Indicators, of which the following is a specification.

My invention relates to an apparatus for indicating the quantity of oil necessary to fill a receptacle to a predetermined level and the objects of my invention are: First, to provide an apparatus to be used in connection with a receptacle in which a fluid is desired to be kept at a certain predetermined level for determining the quantity of fluid required to raise the level to said predetermined level; second, to provide an apparatus of this class which is applicable for use for determining the quantity of lubricating oil necessary to raise the oil to a certain level in a crank case of an engine; third, to provide an apparatus of this class which may be operated from the side of the vehicle or at some distance from the outlet from the receptacle thus eliminating the necessity of crawling under the machine to make the test; fourth, to provide an apparatus of this class which is applicable for use with different makes of vehicle crank cases now in use and fifth, to provide an apparatus of this class which is very simple and economical of construction, durable, easy to install, easy to operate and which will not readily deteriorate or get out of order.

Figure 1:
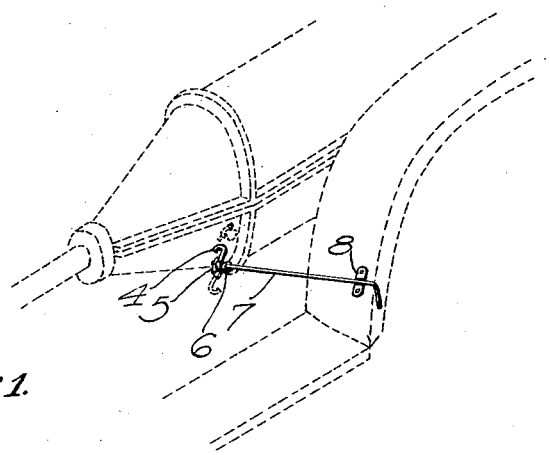
Figures 2, 3:
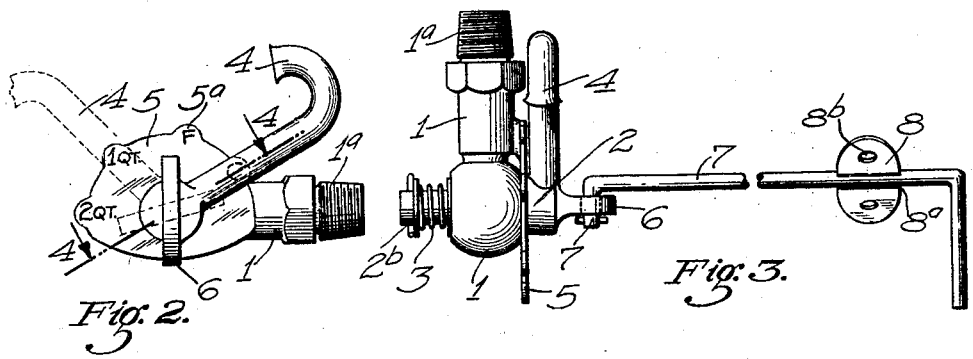
Figure 4:
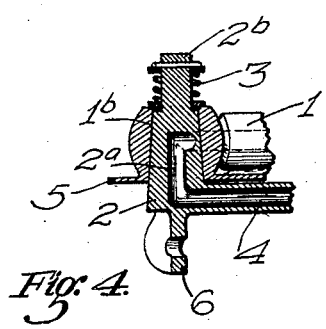

With these and other objects in view as will appear hereinafter my invention consists of certain novel features of construction, combination and arrangement of parts and portions as will be hereinafter described in detail and particularly set forth in the appended claims reference being had to the accompanying drawings and to the characters of reference thereon which form a part of this application in which:

Figure 1 is a perspective view of a vehicle crank case and wheel fender shown by dotted lines and showing my device in position thereon by solid lines on a small scale; Fig. 2 is a side elevational view of my apparatus detached from the machine on an enlarged scale showing by dotted lines another position of the spout when a quart of oil is required for filling the crank case; Fig. 3 is a top or plan view thereof and Fig. 4 is a fragmentary sectional view through 4—4 of Fig. 2.

Similar characters of reference refer to similar parts and portions throughout the several views of the drawings.

The main supporting member 1, tapering pivotal member 2, spring 3, spout 4, indicating plate 5, wing member 6, rod 7 and rod support 8 constitute the principal parts and portions of my fluid level indicator.

The main supporting member 1 is in the form of the body of the conventional pet cock provided with a pipe thread $1^a$ adapted to be screwed into a pipe tapped hole in the crank case in a position slightly below the proper level of the fluid in the case. It is provided with a hole extending longitudinally therein and which communicates with a tapered hole $1^b$ similar to the conventional pet cock body portion. In this tapered hole $1^b$ is revolubly mounted the tapered portion of the member 2 which has a conforming taper to the hole $1^b$ and is provided with an elongated port $2^a$ therein which is adapted to communicate with the hole in the main body 1 with the movement of said tapered portion. This member 2 is provided with a reduced portion $2^b$ upon which is mounted a compression spring 3 interposed between two washers thus providing means for holding the member 2 tightly in the member 1. This member 2 is provided with an extended curved spout portion 4 which is hollow and a continuation of the hole $2^a$ to the outside. Mounted on this portion 2 is a wing member 6 which is provided with a central hole in which is mounted the right angle turn $7^a$ of the rod 7 and said rod 7 extends outwardly and is pivotally connected to the underside of the fender by means of a support 8 which is provided with an offset portion $8^a$ adapted for the pivotal movement of the rod 7 and secured to the fender or other place on the side of the machine by means of screws in the holes $8^b$.

Secured on the side of the body portion 1 is a plate 5 which is provided with offset portions $5^a$ on which are the characters C, F, 1 qt and 2 qts. The character C designating the closed position of the member 4 as shown best in Fig. 2 of the drawings; the character F designating full; the character 1 qt designating that one quart will be required to raise the oil level to the proper height and 2 qts that it requires two quarts to raise the oil level to the proper height, it being noted that the member 4 is turned to the varying positions by means of the rod 7 and if the oil runs out at any of the points discloses the fact that it is full or the quantity of oil necessary to fill.

Though I have shown and described a particular construction, combination and arrangement of parts and portions I do not wish to be limited to this particular construction, combination and arrangement but desire to include in the purview of my invention the construction, combination and arrangement substantially as set forth in the appended claims.

Having thus described my invention what I claim as new and desire to secure by Letters Patent is:

1. An oil level indicating apparatus for engine crankcases, including a ported casing member with one end secured in the side of the crankcase of a gas engine and provided with an indicating scale on one side thereof, and a ported member revolubly mounted therein, provided with an integral extended spout adapted to register with said scale member and form an indicating hand for said scale, the ports in said revoluble member communicating with the ports in said casing member only when said spout is in a certain position.

2. An oil level indicating apparatus for engine crankcases, including a ported casing member with one end secured in the side of the crankcase of a gas engine and provided with an indicating scale on one side thereof, a ported member revolubly mounted therein, provided with an integral extended spout adapted to register with said scale member and form an indicating hand for said scale, the ports in said revoluble member communicating with the ports in said casing member only when said spout is in a certain position, and an extension member secured to said revoluble member to facilitate the turning of the same at a position some distance from said revoluble member.

3. An oil level indicating apparatus for engine crankcases, including a ported casing member with one end secured in the side wall of an engine crankcase near the bottom side thereof and communicating with the interior thereof and provided on one side with an integral indicating scale, a tapered, revoluble member, revolubly mounted therein, provided with ports communicating with the ports in said casing member when revolved to certain positions and closed when revolved to other positions, provided with a spring on one side tending to hold said revoluble member in position in said casing and provided on its opposite side with an integral extended, hollow spout communicating with the port in said revoluble member, said spout forming an indicating hand registering with said indicator for indicating the position of the oil in the crankcase, a lug connected with said revoluble member provided with a hole therein, and an extended rod with an integral right angle turned in its opposite ends, with one of said ends extending through the hole in said lug, adapted to facilitate the turning of said revoluble member at some distance from the same.

In testimony whereof, I have hereunto set my hand at San Diego, California, this 6th day of July 1920.

HENRY PERKINS.